United States Patent [19]

Eisenbarth et al.

[11] Patent Number: 5,059,665

[45] Date of Patent: Oct. 22, 1991

[54] HEAT-CURABLE BISMALEIMIDE RESINS

[75] Inventors: Philipp Eisenbarth, Bad Duerkheim; Roland Peter, Mutterstadt; Thomas Folda, Neuleiningen, all of Fed. Rep. of Germany

[73] Assignee: BASF Aktiengesellschaft, Ludwigshafen, Fed. Rep. of Germany

[21] Appl. No.: 568,308

[22] Filed: Aug. 15, 1990

[30] Foreign Application Priority Data

Sep. 5, 1989 [DE] Fed. Rep. of Germany ....... 3929386

[51] Int. Cl.$^5$ ............................................. C08F 22/40
[52] U.S. Cl. .................................................. 526/262
[58] Field of Search ........................................ 526/262

[56] References Cited

U.S. PATENT DOCUMENTS

| | | | |
|---|---|---|---|
| 4,100,140 | 7/1978 | Zahir et al. | 526/90 |
| 4,173,592 | 11/1979 | Suzuki et al. | 525/134 |
| 4,737,568 | 4/1988 | Stenzenberger | 528/170 |
| 4,743,647 | 5/1988 | Domeier | 526/262 |
| 4,853,449 | 8/1989 | Domeier | 526/262 |

*Primary Examiner*—Joseph L. Schofer
*Assistant Examiner*—Alex H. Walker
*Attorney, Agent, or Firm*—William G. Conger

[57] ABSTRACT

Heat-curable bismaleimide resins containing an aromatic alkenyl compound, preferably o,o'-diallylbisphenol A, and a Lewis acid as an additive for prolonging the pot life at elevated temperatures are suitable for impregnating reinforcing fibers, rovings so impregnated having a prolonged gel time and being usable for fabrication of wound structures.

4 Claims, No Drawings

HEAT-CURABLE BISMALEIMIDE RESINS

The present invention relates to heat-curable bismaleimide resins of increased storage stability.

Bismaleimide resins which, according to US-A-4 100 140, contain alkenylphenols or alkenylphenol ethers as comonomers can be cured to give materials of constructions having good mechanical and electrical properties. However, if these bismaleimide resins are used to impregnate prepregs composed of reinforcing fibers, the comparatively short pot life of the resins becomes noticeable in the processing of the prepregs. There is a particularly troublesome tendency for the viscosity to increase and for premature gelling to occur in the fabrication of wound structures by winding resin-impregnated rovings onto mandrels at from 70 to 120° C.

EP-A-296 112 recommends adding to curable mixtures of bismaleimide resins and alkenyl comonomers certain stabilizers, for example dihydroxybenzenes, sterically hindered phenols or aromatic amines, in order that the tackiness of the mixtures may be retained for a prolonged period during storage. It has been found that such stabilizers or antioxidants are not capable of sufficiently extending the pot life of the resins.

It is an object of the present invention to provide bismaleimide resins having a sufficiently long pot life, in particular at elevated temperatures, without the additive reducing the mechanical properties of corresponding shaped articles.

We have found that this object is achieved by heat-curable resins containing
A) 100 parts by weight of a bismaleimide,
B) 5–100 parts by weight of an aromatic alkenyl compound as comonomer and
C) 0.01–2.0 parts by weight of a Lewis acid.

A suitable component A is a bismaleimide of the general formula

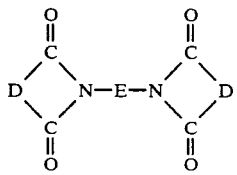

where D is a substituted or unsubstituted carbon double bond and E is a divalent radical containing at least two carbon atoms. Bismaleimides are known for example from DE-A-2 040 094, DE-A-2 719 903 and DE-A-3 247 058. Besides bismaleimides it is basically also possible to use polymaleimides and mixtures of different bismaleimides. Preferred bismaleimides are 4,4'-bismaleimidodiphenylmethane, 4,4'-bismaleimidodiphenyl ether, 3,3'-bismaleimidodiphenyl sulfone, 1,3-bismaleimidobenzene, 2,4-bismaleimidotoluene, 1,6-bismaleimidohexane and 2,2,4-trimethyl-1,6-bismaleimidohexane. It is also possible for up to 20% by weight of a monoimide to be present.

Alkenyl compounds B are monocyclic or polycyclic aromatic compounds having at least one alkenyl substituent of from 2 to 6 carbon atoms, the alkenyl group being bonded to the benzene ring directly or via an oxygen atom. Preference is given to allyl and propenyl compounds, in particular to those which have not only an OH group but also an alkenyl group on the same benzene ring. This includes bicyclic allylphenols, for example o,o-diallylbisphenol A; other suitable allylphenols are based for example on bisphenol F or corresponding novolaks, bisphenol S, hydroquinone or dicyclopentadiene as described in EP-A-276 733. Other suitable alkenyl compounds are for example 2,6-di(2-propenylphenoxy)pyridine, 4,4'-di(2-propenylphenoxy)benzophenone, 4,4'-bis(2-propenylphenoxy)diphenyl sulfone and other oligomers as described in EP-A-230 741. Other usable alkenyl compounds B are divinylbenzene, diallylbenzene, styrene and α-methylstyrene.

The proportion of alkenyl compounds B is from 5 to 100 parts, based on 100 parts of bismaleimide; preferably it is from 30 to 80 parts. If the proportion is lower, the viscosity increases and the tackiness of corresponding prepregs is too low, which causes processing problems; if the proportion is greater than 100 parts, the glass transition temperature drops off too much.

A suitable Lewis acid is any known electron acceptor. Lewis acids are described in detail in Römpp's Chemielexikon, volume 3, 8th edition, page 2360, in the references cited therein.

Preference is given to the halides, alcoholates and carboxylates (e.g. naphthenates, acetylacetonates or octoates) of the elements boron, aluminum, tin(IV), phosphorus(V), arsenic, antimony, titanium, chromium(III), cobalt, iron(III), nickel(II), copper(II) and zinc.

Examples of suitable Lewis acids are $BF_3$ complexes, such as etherates and amine complexes, $AlCl_3$, $AsCl_5$, $SbCl_5$, $SbF_5$, $PCl_5$, $FeCl_3$, $SnCl_4$, and also titanium tetrabutylate, titanium tetraisopropylate, dibutyltin dilaurate, Cu(II) naphthenate, iron(III) naphthenate, zinc(II) naphthenate and the corresponding octoates and acetylacetonates.

The Lewis acid is used in an amount of from 0.01 to 2, preferably from 0.02 to 0.5, parts by weight, based on 100 parts by weight of A. If more than 2 parts by weight are added, this may have an adverse influence on the mechanical properties of the molding materials; too small amounts are ineffective. By varying the choice and amount of Lewis acid, it is possible to set the pot life of the resin to a specific value.

The mixtures may contain catalysts and inhibitors as further additives. Suitable catalysts are tertiary amines or phosphines, imidazoles or organic acids or peroxides. Suitable inhibitors are hydroquinone, benzoquinone and phenothiazine. The amount of initiator and inhibitor used is approximately within the range from 0.05 to 1.0 part by weight, based on 100 parts by weight of A.

It is also possible to add customary fillers and reinforcing agents, e.g. quartz powder, kaolin, mica, graphite powder or metal powder, and also glass and carbon fibers, preferably in amounts of from 10 to 500 parts by weight, based on 100 parts by weight of component A.

To prepare the bismaleimide resins according to the present invention, the starting materials are mixed in a conventional manner and heated to 70–150° C. to form a prepolymer. Depending on the rate of reaction, a prepolymer is obtained in the form of a viscous melt of relatively low viscosity or in the form of a glassy solid which, depending on the intended use, is ground or dissolved in a solvent. The preparation of the resins can also take place in a solvent.

The mixtures according to the present invention are suitable for use as impregnating, casting or laminating resins, as molding compositions (filled or unfilled) or as adhesives.

A preferred use is the fabrication of prepregs or high-performance composites, which involves impregnating glass, carbon or aramid fibers either from the melt at 50–120° C. or from solution and forming unidirectional or woven fabric prepregs. Suitable solvents are halogenated hydrocarbons, e.g. dichloromethane, ketones, e.g. acetone or methyl ethyl ketone, glycol esters, toluene, dimethylformamide, N-methylpyrrolidone and mixtures thereof.

It is preferable to impregnate rovings from the melt at from 50 to 120° C., preferably at from 60 to 90° C. The reinforcing fibers are oriented in the preferred direction of the later composite; it is possible to use conventional continuous filament bundles (rovings) made of glass, aromatic polyamides and preferably carbon. It is a particular advantage that it is also possible to use a plurality of individual rovings in the form of a unidirectional fiber tape or in the form of a woven fabric.

The volume ratio of plastics matrix to reinforcing fibers is preferably within the range from 70:30 to 15:85, in particular from 50:50 to 30:70.

The prepregs produced according to the present invention may be used in a conventional manner to produce sheetlike components, by cutting them to size, placing the cuts on top of one another and shaping the pile, or preferably to produce rotationally symmetrical components, by winding. They are then cured by heating at from 150 to 300° C., preferably at from 160 to 260° C., with or without employment of pressure, to give high-performance composites. The choice of curing temperature depends crucially on the length of cure, and vice versa. In many cases it is advantageous to effect the cure in stages by first crosslinking the polymers at a lower temperature with shaping. Demolding can then be followed by a postcure at above 200° C. to completion, which may take several hours.

These high-performance composites have excellent mechanical and thermal properties and can be used in particular as moldings for the automotive and aerospace industries.

EXAMPLE

Bismaleimide resins were prepared from 100 parts by weight of 4,4'-bismaleimidodiphenylmethane, 67 parts by weight of an alkenyl comonomer and from 0.15 to 0.3 part by weight of a stabilizer.

The gel time in min was measured at 180° C. (DABA) and 150° C. (PPP); the results are shown in the table, where
DABA denotes o,o'-diallylbisphenol A and
PPP denotes 2,6-di(propenylphenoxy)pyridine.

Examples A to E are comparative. Examples B, C and D were carried out using stabilizers representing the state or the art (EP-A-296 112).

TABLE

| Example | Comonomer | Stabilizer | Parts by weight | Gel time (min) |
| --- | --- | --- | --- | --- |
| A | DABA | — | — | 34 |
| 1 | DABA | SbCl$_5$ | 0.3 | 75 |
| 2 | DABA | BF$_3$.ethylamine | 0.3 | 72 |
| 3 | DABA | BF$_3$.ethylamine | 0.15 | 61 |
| 4 | DABA | Titanium tetrabutylate | 0.3 | 65 |
| 5 | DABA | Cu-naphthenate | 0.3 | 45 |
| 6 | DABA | Dibutyltin dilaurate | 0.3 | 44 |
| 7 | DABA | Fe(III) naphthenate | 0.3 | 44 |
| 8 | DABA | Zn-naphthenate | 0.3 | 41 |
| B | DABA | Hydroquinone | 0.3 | 36 |
| C | DABA | 4,4'-Diaminodiphenylmethane | 0.3 | 31 |
| D | DABA | Irganox 1010 (polyphenol from CIBA-GEIGY) | 0.3 | 33 |
| E | PPP | — | — | 35 |
| 9 | PPP | SbCl$_5$ | 0.3 | 43 |
| 10 | PPP | SbCl$_5$ | 0.15 | 41 |

We claim:
1. A heat-curable bismaleimide resin having extended gel time consisting essentially of
A) 100 parts by weight of a bismaleimide,
B) 5–100 parts by weight of an aromatic alkenyl compound, and
C) 0.01–2.0 parts by weight of a Lewis acid wherein the gel time of the resin is greater than the same resin without said Lewis acid.
2. A bismaleimide resin as claimed in claim 1, wherein the alkenyl compound used is a diallylphenol, preferably o,o'-diallylbisphenol A.
3. A bismaleimide resin as claimed in claim 1, wherein the Lewis acid is a halide, alcoholate or carboxylate of boron, aluminum, arsenic, antimony, phosphorus, iron, titanium, tin, copper or zinc.
4. A heat-curable bismaleimide resin having extended gel time consisting essentially of
A) 100 parts by weight of a bismaleimide,
B) 5–100 parts by weight of an aromatic alkenyl compound, and
C) 0.01–2.0 parts by weight of a Lewis acid wherein the gel time of the resin is greater than the same resin without said Lewis acid,
D) an amount of a catalyst effective to accelerate the cure of said resin.

* * * * *